United States Patent
Inkumsah et al.

(10) Patent No.: US 8,826,418 B2
(45) Date of Patent: Sep. 2, 2014

(54) TRUST RETENTION

(71) Applicant: International Business Machines Corporation, Armonk, NY (US)

(72) Inventors: Kobina Kweenu Inkumsah, Lansing, MI (US); Adrian X. Rodriguez, Durham, NC (US); Eric Woods, Durham, NC (US); Ping Zhou, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 13/653,498

(22) Filed: Oct. 17, 2012

(65) Prior Publication Data

US 2014/0109220 A1    Apr. 17, 2014

(51) Int. Cl.
| G06F 7/04 | (2006.01) |
| G06F 12/00 | (2006.01) |
| G06F 12/14 | (2006.01) |
| G06F 13/00 | (2006.01) |
| G11C 7/00 | (2006.01) |

(52) U.S. Cl.
USPC ............................................ 726/19; 713/185

(58) Field of Classification Search
USPC .......................................................... 726/19
See application file for complete search history.

(56) References Cited

U.S. PATENT DOCUMENTS

| 6,119,121 A | 9/2000 | Zhu |
| 6,785,728 B1 * | 8/2004 | Schneider et al. ............ 709/229 |
| 7,505,482 B2 | 3/2009 | Adamczyk et al. |
| 7,720,843 B2 | 5/2010 | Brunner et al. |
| 2008/0092209 A1 * | 4/2008 | Davis et al. ........................ 726/2 |
| 2008/0301791 A1 * | 12/2008 | Smith et al. ........................ 726/7 |
| 2009/0282243 A1 * | 11/2009 | Rose et al. ..................... 713/159 |
| 2009/0292924 A1 * | 11/2009 | Johnson et al. ............... 713/176 |
| 2010/0122329 A1 * | 5/2010 | Jakobsson et al. ................ 726/6 |
| 2010/0154061 A1 | 6/2010 | Ollmann |
| 2010/0268576 A1 | 10/2010 | Morris |
| 2010/0299746 A1 * | 11/2010 | Shu ................................. 726/18 |
| 2012/0054847 A1 * | 3/2012 | Schultz et al. .................... 726/9 |
| 2012/0167201 A1 | 6/2012 | Maeda et al. |
| 2013/0055381 A1 * | 2/2013 | Hao et al. ........................ 726/18 |
| 2013/0091540 A1 * | 4/2013 | Chen et al. ........................ 726/1 |

OTHER PUBLICATIONS

Xavier Boyen; Halting Password Puzzles Hard-to-break Encryption from Human-memorable Keys; Year: 2007; USENIX Association; pp: 120-134.*

* cited by examiner

*Primary Examiner* — Mohammad W Reza
*Assistant Examiner* — Monjour Rahim
(74) *Attorney, Agent, or Firm* — Parashos Kalaitzis; Robert C. Rolnik

(57) ABSTRACT

A method, system and computer program product for retaining trust. A computer receives a correct password for administrative access. The computer sets a trust to a maximum level. The computer detects at least one period of inactivity. The computer adjusts a trust based on the at least one period of inactivity. The computer receives a request to access an privileged function. The computer, responsive to receiving the request, determines that the trust is below a trust threshold. The computer, responsive to determining that the trust is below the trust threshold, challenges the user to authenticate. The computer receives a authentication attempt. The computer determines whether the authentication attempt is correct. The computer, responsive to a determination that the authentication attempt is correct, grants access to the administrative function.

17 Claims, 5 Drawing Sheets

*FIG. 2*

201 { Sudo rm /System/*
     Enter first 6 chars of
203 { your password:

TRUST RETENTION

BACKGROUND

The present invention relates to a computer implemented method, data processing system, and computer program product for establishing that a current user accessing a data processing system is correctly responding to challenges in a way indistinguishable from the authorized user. More particularly, the invention relates to gauging the certainty of a user being genuine, and posing a stronger challenge or puzzle to the apparent user depending on the level of inactivity from input devices.

Data processing systems store data that can be secret, confidential or otherwise privileged details of a particular user, or an organization to which the user belongs. Accordingly, the owner or operator of such systems establish a password or other challenge that is known only to the authorized user or at least is the subject of a policy whereby the user is asked to avoid sharing or accidentally making available the password. These passwords and the attendant obfuscation that blocks their availability to spies have been in use for decades.

Nevertheless, black hat hackers can compromise passwords using many techniques, including social engineering. Normally, these techniques make simpler passwords more vulnerable to guessing by such hackers than more complex passwords.

However, when a computer re-iterates a challenge for a difficult password, especially within a short interval of previously authenticating a user, the user can be frustrated and less efficient. A policy of frequently getting a user to refresh his credentials does achieve high levels of security and integrity of the data processing system.

SUMMARY

According to one embodiment of the present invention, method, system and computer program product for retaining trust is disclosed. A computer receives a correct password for administrative access. The computer sets a trust to a maximum level. The computer detects at least one period of inactivity. The computer adjusts a trust based on the at least one period of inactivity. The computer receives a request to access a privileged function. The computer, responsive to receiving the request, determines that the trust is below a trust threshold. The computer, responsive to determining that the trust is below the trust threshold, challenges the user to authenticate. The computer receives authentication attempt. The computer determines whether the authentication attempt is correct. The computer, is responsive to a determination that the authentication attempt is correct, and grants access to the privileged function.

BRIEF DESCRIPTION OF THE SEVERAL VIEWS OF THE DRAWINGS

FIG. 2 is a user interface showing a puzzle in accordance with an embodiment of the invention;

DETAILED DESCRIPTION

Figure 1:
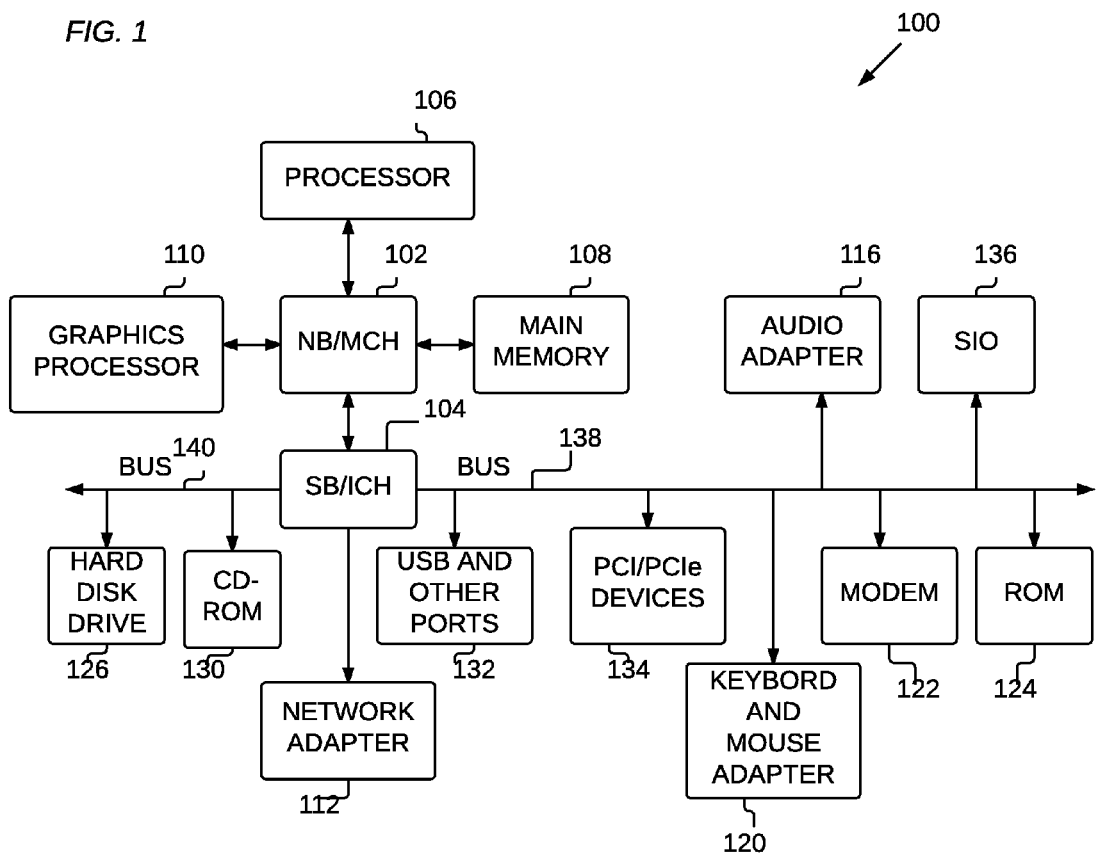
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on computer readable tangible storage devices, such as hard disk drive 126, and may be loaded into main memory 108 for execution by processor 106. The processes of the embodiments can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, one or more embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Accordingly, features of the illustrative embodiments may permit a user to first become authenticated with a high degree of certainty, or at least at a level of certainty that is less than 100%. Later, the user may be authenticated with a challenge or puzzle that is of a complexity commensurate with the duration or accumulated durations of lack of measured activity at the user's input location, for example, by keyboard, mouse, and the like.

FIG. 2 is a user interface showing a puzzle in accordance with an embodiment of the invention. A puzzle includes any challenge made in response to an attempt to access an privileged function, where the challenge prompts the purported user to provide information that is simpler or of lower complexity than the password that is used to fully authenticate the purported user. A privileged function is a function executed on an information system involving the control, monitoring, or administration of the system. On the other hand, a non privileged function is a function that does not involve the control, monitoring or administration of the system. The non-privileged function include user functions, to the extent they do not rely on privileged functions, for example, movement of a mouse and its corresponding on-screen cursor. FIG. 2 shows the attempt to perform an privileged command 201. The privileged command can access an privileged function. In this case, the command 'rm', is the privileged function to remove files from the file system, or otherwise make the files more difficult to recover. The command line interface embodiment controlled by the data processing system may issue challenge 203. A user may then respond with the information requested, which may be lower complexity or be easier for the user to enter than the correct password.

A correct password is the password that a user is asked to provide before a computer elevates the user's session to being fully trusted. 'Fully trusted' means that the trust is set to a maximum level. Complexity is a relative description of the ease by which the putative user can recall and input the password without error. Complexity can be measured in two forms.

Permutation complexity is the complexity obtained by multiplying each possible place of a password string by the number of optional characters used in that place. For example, in a password that allows only alphabetic characters, and has eight places for the 26 options allowable in the English alphabet, there are $26^8$ permutations that would exhaust all possibilities for a password of eight characters in length. Accordingly, a formula for permutation complexity is: $X^N$, where 'X' is the character options available for each character place, and 'N' is the length of the string for the password. A character option is the size of the allowable characters that may be used per character place. For example, the alphabet of letters a-z, has character options of 26, while the alphanumeric character set has character options of 36. A password of 14 alphabetic characters is permutation complex approximately $6.45 \times 10^{19}$. A password of 6 alphabetic characters is permutation complex: 308,915,776. The password 'rumplestilskin' is more permutation complex than the 6-letter password 'rumple' in a password-challenge that accepts only alphabetic characters.

Subjective complexity is the complexity measured by the ease by which the putative user can recall and input the password without error. In other words, memorability of the password or puzzle is easier for a password or puzzle that is less subjectively complex than another password or puzzle. The ease by which the putative user can recall and input the password is controlled by a number of factors, including, for example, preferred language of the user, education, relationships, tastes, and experience with using a keyboard or other device used to enter the password. For a hypothetical user, who is below average at spelling English words, the word 'science' may be considered more complex than the password 'supermarket'. By the same token, for a hypothetical user, who is highly skilled with math, but lags in English, might consider '3.14159265' to be a less complex password or puzzle as compared to 'rhythm12'.

Figure 3:
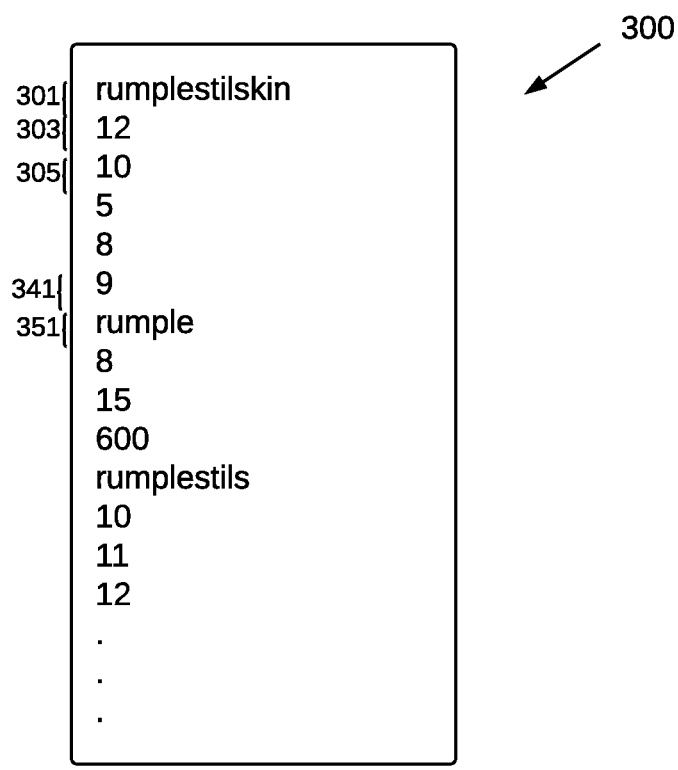
FIG. 3 is a log of passwords and puzzles in accordance with an embodiment of the invention.

FIG. 3 is a log of passwords and puzzles in accordance with an embodiment of the invention. FIG. 2, is a terminal session, which may be a window within a data processing systems user interface. A user can be entering inputs to the computer through a computer keyboard, a mouse, a pointing device or the like. Accordingly, each input can be episodic, consisting of key-presses, key-releases, mouse clicks, mouse releases, mouse movements and other events. Between each event, the latency period may be measured. If such latency exceeds a latency threshold, the latency may be counted as a period of inactivity.

A period of inactivity is a period that the user fails to enter any input to the computer that is at least longer than the threshold. The period of inactivity ends when the user resumes use of the input devices. An input device can be a mouse or a keyboard. Other devices, such as track-pads and microphones can also be input devices. Log 300 can record the passwords, and responses to less challenging puzzles, in addition to each period of inactivity. For example, password 301 may be a first password that is correctly entered. Periods of inactivity may be rounded to the nearest second. The threshold to detect a period of inactivity may be 0.5 seconds. Accordingly, inactivity 303 may be an entry that records 12 seconds between keystrokes, while inactivity 305 may be an entry that records 10 seconds between to mouse control events. It is appreciated, that periods of inactivity can be measured between input events, generally. Further, that the events do not have to be of the same type. For example, a user may use the keyboard, then pursue other matters for a length of time; then use the keyboard. The period of inactivity measured can be the time between keyboard discontinuation, and the following input through the mouse.

Initially, a password may be recorded to log 300, such as, password 301. A typical scenario can include an application programming interface (API) being operational shortly after booting a computer. As an initial step to interacting with a user, the API may challenge the user for a password, which if successfully entered, may appear in the log 301. It is appreciated, that the password, as logged, may be encoded or hashed in some manner. Periodically, as sufficient periods of inactivity are logged, the API, explained further in FIG. 4, below, may challenge the user to provide puzzle responses or puzzle attempts. For example, puzzle response 351, 'rumple', may be a correct response used to boost the trust established for future administrative functions.

An alternate form of the log may track inactivity periods leading up to a key-press and inactivity periods leading up to a mouse event with differing weights. Accordingly, at a time when trust is to be tested, a sum of inactivity broken by key input, or keyboardidleTime, and a sum of inactivity broken by mouse input, or mouseidleTime, can be used to compute a hybrid trust value, based on differing weights placed on each inactivity period, for example, as shown in Table 1, below.

TABLE 1

```
/**
 * This function may be implemented by the system administrator for
custom control.
 * The user's confidence threshold decreases as a function of time.
 */
function computeConfidenceThreshold(keyboardIdleTime,
mouseIdleTime ...) {
var keyboardWeight = .3;
var mouseWeight = .7;
return 1 / (keyboardIdleTime * keyboardWeight + mouseIdleTime *
mouseWeight)
}
```

Figure 4:
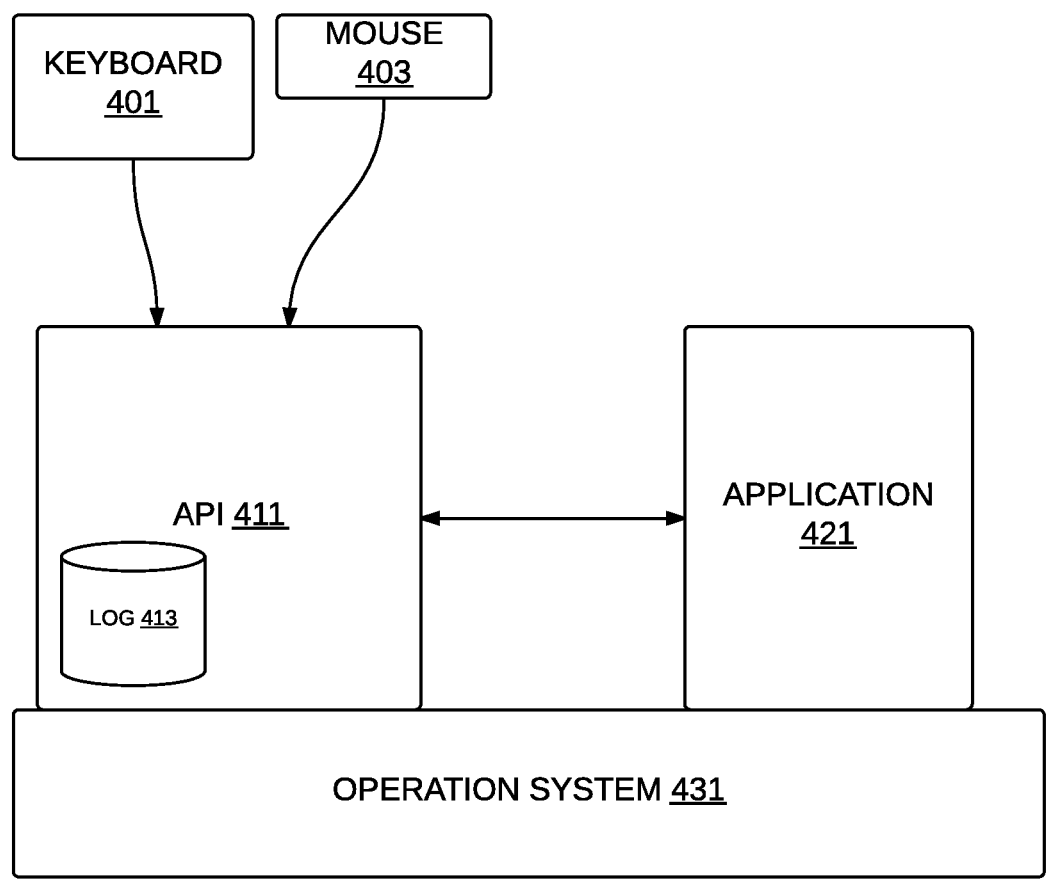
FIG. 4 is a software component diagram showing the operation of the API in accordance with an embodiment of the invention.

FIG. 4 is a software component diagram showing the operation of the API in accordance with an embodiment of the invention. API 411 may operate as a software component to a data processing system, such as, for example, data processing system 100, of FIG. 1. Operating system 431 may support both API 411 and application 421 by providing system level access to resources of the computer. API 411 may control the log 413, which may be arranged according to log 300 of FIG. 3. Inputs from keyboard 401, mouse 403, and similar input devices can be filtered by API 411, and such inputs can be passed to application 421 along with any revisions to the trust level assigned to currently entered administrative commands.

There is an alternative API embodiment. Accordingly, an API that relies on code of Table 1, may, rather than receive keystrokes and mouse inputs directly, instead be reported idle times that the application reports.

Figure 5:
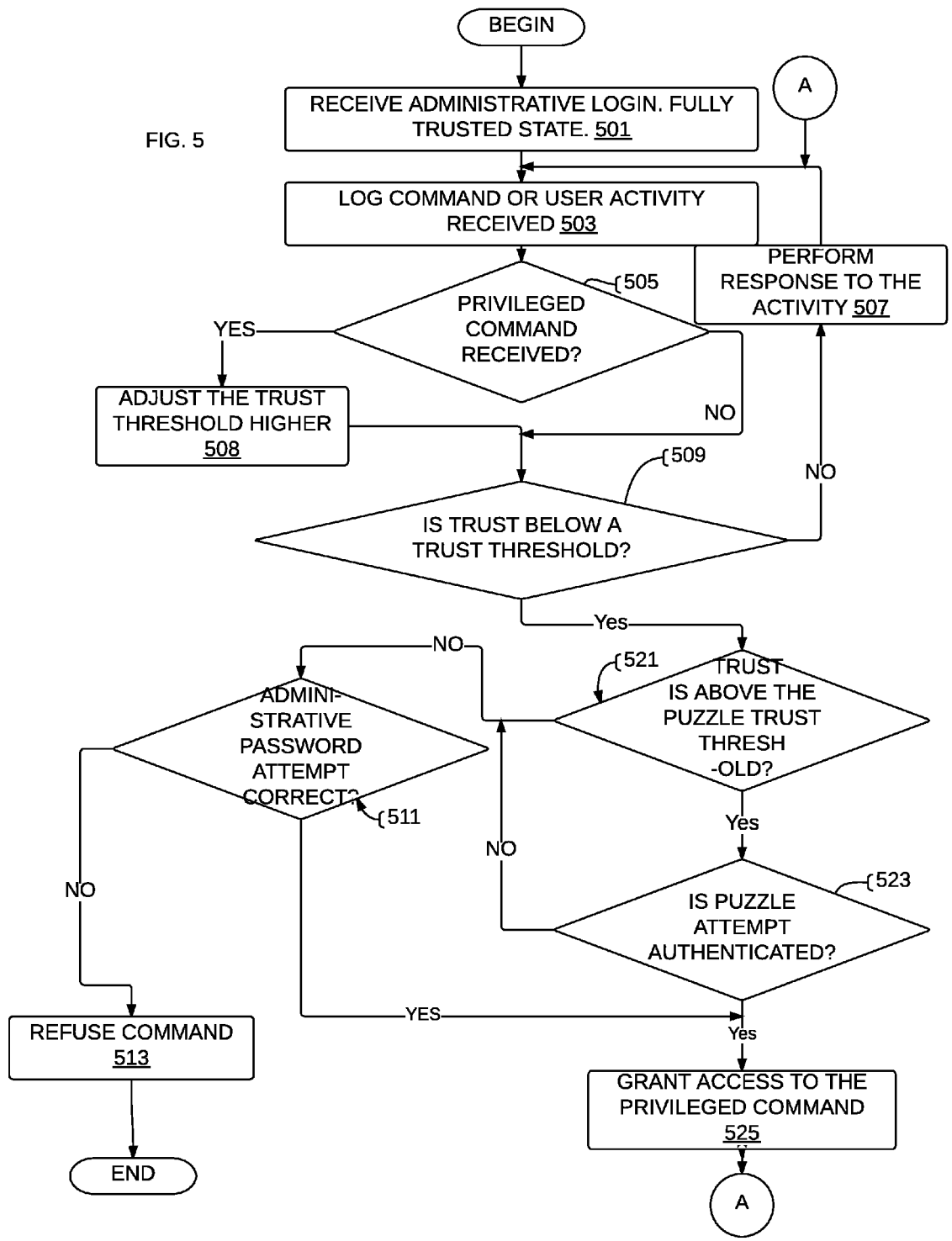
FIG. 5 is a flowchart showing the method of determining authentication states and/or execution of commands in accordance with an embodiment of the invention.

FIG. 5 is a flowchart showing the method of determining authentication states and/or execution of commands in accordance with an embodiment of the invention. Initially, a computer receives an administrative login (step 501). The administrative login is accompanied by a correct password for administrative access. In other words, the user may provide a login ID, and also, a correct password or administrative password that corresponds to the login ID. Accordingly, the computer may set trust to a maximum level in response to receiving the administrative password. Trust is a value that can vary between a maximum level, such as, for example, 100%, and a minimum level, such as, for example, 0%. The maximum level and the minimum level are the upper and lower limits of trust, respectively. A trust can correspond to a particular user session, and to a limited number of input devices that are present at a location of the user. A user session is continuous until trust becomes a minimum level. It is appreciated that a user session is a presumption or inference that a computer can make that the current stream of inputs is coming from the authenticated user. As such, many potential scenarios exist where even this presumption, is not the actual reality. For example, a user, who is injured, may have an assistant actually type requested commands, while the user shares the password and/or puzzle response to that assistant. Similarly, an accomplished spy may compromise the password and/or puzzle response, and spoof the computer with responses that are not actually from the true user. Many other forms of compromise to such passwords and puzzles can be possible. Accordingly, the trust established by the computer merely may correspond with differing levels of certainty or risk that the inputs received are from the user to which the password and/or puzzle is assigned.

Next, the user may enter keyboard commands, mouse inputs or produce other activity. Accordingly, the computer can log the command or user activity that is received (step 503). The log can be a mere record of significant breaks in the stream of events the computer receives, along with password entries, or at least hashed password entries. The log may include at least one period of inactivity. As such, the logging or recording of such inactivity is a way the computer detects the inactivity.

Next, the computer may determine whether a privileged command is received (step 505). A computer receives a request to access a privileged function when it receives an privileged command. A privileged command is a command that affects the fundamental operation of a computer. Fundamental operation can be changed by changing software executable files, changing preferences or tunables, deleting executable files, and the like. A privileged command can be a command to delete a file owned by an administrator. A privileged command can be a conversion of an encrypted file to clear-text.

Accordingly, some tests for a privileged command can include, determining that the command is a privileged command if it accesses a file owned by an administrator. Such a command may include permissions to read, write or execute such a file. If no privileged command is received as part of the user activity, then processing continues by the computer determining if trust is below a trust threshold (step 509). Trust can be determined or adjusted in response to accrued periods of inactivity, as modified by a user's responses to puzzles and other authentication determinations, as explained further in reference to equation [1] below.

However, responsive to receive a request to access a privileged function, the computer may adjust the trust threshold to a trust threshold higher than is the trust threshold absent a request to access a privileged function (step 508). Next, after step 508, the computer may determine that the trust is below the trust threshold (step 509). Step 509 may be reached after step 505 determines a negative result. A trust threshold is a value between the minimum level and the maximum level which is used to determine whether simplistic methods of authenticating are to be used or whether more complex methods of authenticating are to be used. Simplicity and complexity can be relative terms that are measured relative to the purported user's ability to recall and input the correct authenticating response, as explained above.

Trust can be modified by periods of inactivity. For example, a sum of the logged periods may be established for all periods of inactivity since a last refresh to the level of trust. For example, if a privileged command was entered to conclude the period of inactivity 341 of FIG. 3, the last refresh of the level of trust was at the time 'rumplestilskin' 301 was entered. Accordingly, periods of inactivity 303, 035, 307, 309 and 341 can be summed together for a total of 44. Trust can be a value established based on this sum. For example the trust can be inverse to the summed periods, such that trust is a smaller number as more time is summed for the periods of inactivity. As such, trust may be a constant divided by the sum. One formula for trust, T, can be:

$$T = C/\Sigma p \qquad [1]$$

where the constant, C, can be '40 seconds', and p is all periods of inactivity since the previous refresh of trust.

Trust may then be compared to the trust threshold. For example, using the formula [1], above, the trust threshold can be 1, and the trust threshold is passed when trust is lower than 1. This situation can happen when over 40 seconds of inactivity occur. Accordingly, the computer determines that trust is below a trust threshold (step 509). In other words, a positive determination can be made if the log since the last authentication or refresh in trust has a collective gap in time longer than the trust threshold. Thus, as the periods of inactivity accumulate, trust is reduced, until it no longer is sufficiently high for unchecked acceptance.

Accordingly, responsive to the trust being above the threshold, processing resumes at step 507, and no challenge to the user is immediately necessary. However, responsive to the trust being below the trust threshold, the user is challenged in some way. To determine the form of challenge, the computer determines if trust is above the puzzle trust threshold (step 521). A puzzle trust threshold is a threshold that permits a puzzle challenge to be established when trust is below the trust threshold and above the puzzle trust threshold. Accordingly, if there is sufficient trust for a puzzle, the computer issues the challenge in the form of a puzzle and determines whether the puzzle attempt is authenticated (step 523). A puzzle attempt is the user's apparent attempt to provide the string, or other response, that matches the puzzle known to the computer. In other words, the computer receives a puzzle attempt, and subsequently determines whether the puzzle attempt is correct.

If the puzzle attempt is not authenticated, or if there is insufficient trust for a puzzle, the computer challenges the user to provide the administrative password, and determines if the password attempt is the correct password (step 511). If this password attempt is incorrect, the computer refuses the command (step 513). An administrative password is the most complex form of a password with which the user will be challenged in order to access the local functions in the computer.

Responsive to either a positive determination at steps 523 or 511, the computer may grant access to the privileged command 525. Granting access to the command is granting access to the privileged function. Granting access to the command may mean executing the command, or revising any stored file upon which the command depends. As such, the computer grants access to the privileged command. A positive determination at step 523 is that the puzzle response is correct. A positive determination at step 511 is that the administrative password attempt is correct. The administrative password given and tested at step 511 may be a second, more complex password than a password compared at an earlier (and failed) step 523.

One scenario of entering two passwords to reach step 525 is as follows. A user enters the administrative password to establish a maximum level of trust in conjunction with step 501. Some period or periods of inactivity are logged in a way that lets trust to be recalculated at a sufficiently low level to trigger a test at step 521. However, trust is still sufficiently high, that the computer challenges the user for a puzzle as part of step 523. The user, then provides a second password of lower complexity than the administrative password. The second password can be, for example, 'rumple' 351 of FIG. 3. Such a password may be correct if the puzzle challenge is, "give the first six letters of your password". Accordingly, in response to the second password being correct, the command may be executed at step 525.

An optional step following step 525, is for the computer to discard the log, record the correct puzzle response, or at least a hashed version of the puzzle response, and reset or otherwise increase the trust to a higher level, for example, a maximum level. A further optional step can be to re-establish the trust threshold to a default trust threshold, for example, a trust threshold to apply to requests to access a non-privileged command. The steps in FIG. 5 may be implemented in the API, the application, or both, as described in FIG. 4 and elsewhere.

Accordingly, illustrative embodiments of the invention may reduce interruptions in workflow caused by casual interruptions in user activity at the computer. For example, a shorter password can deter a brute force attempt to crack the password, since a failure to enter the puzzle challenge correctly, the first time, reverts the data processing system to performing a normal check on the more complex password. Conversely, a shorter password can take less time for a genuine user to enter as compared to the more complex password. In addition, common errors, such as fat-fingering the keyboard, are less likely when a challenge calls for a shorter password.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for retaining trust, the method comprising:
a computer receiving a correct password for a privileged function;
the computer setting a trust to a maximum level;
the computer detecting at least one period of inactivity;
the computer adjusting a trust based on the at least one period of inactivity;
the computer receiving a request to access a privileged function, after receiving the correct password and detecting the at least one period of activity;
the computer responsive to receiving the request, determining that the trust is below a trust threshold;
responsive to determining that the trust is below the trust threshold, the computer challenging a user to re-authenticate by presenting a puzzle of less complexity than a complexity of the correct password;
the computer receiving a re-authentication attempt, comprising a puzzle attempt, wherein the puzzle attempt is of less complexity than the correct password, wherein complexity is proportional to a number of character options in the puzzle attempt;
the computer determining whether the puzzle attempt is correct; and
the computer responsive to a determination that the puzzle attempt is correct, granting access to the privileged function.

2. The method of claim 1, wherein challenging the user to re-authenticate comprises challenging the user to provide the puzzle attempt, and in response, receiving the puzzle attempt; and further comprising:
responsive to a determination that the puzzle attempt is correct, increasing the trust.

3. The method of claim 1, wherein adjusting the trust is based on the at least one period of inactivity further comprises:
summing all periods of inactivity to form a sum;
dividing a constant by the sum; and
the trust threshold is 60 seconds or less.

4. The method of claim 3, wherein receiving the request to access the privileged function comprises:
receiving a request; and
determining the request is the request to access the privileged function; and
wherein determining the trust is below the trust threshold comprises adjusting the trust threshold higher than the trust threshold corresponding to the request being a request to access a non-privileged function.

5. The method of claim 1, wherein complexity is inversely proportional to a memorability of the password or puzzle.

6. A computer program product for retaining trust, the computer program product comprising: a computer readable storage medium having program code embodied therewith, the program code readable/executable by a computer to:
receive a correct password for a privileged function;
set a trust to a maximum level;
detect at least one period of inactivity;
adjust a trust based on the at least one period of inactivity;
receive a request to access privileged function;
determine that the trust is below a trust threshold but above a puzzle threshold, responsive to receiving the request;
challenge a user to present a puzzle of less complexity than a complexity of the correct password, responsive to determining that the trust is below the trust threshold but above the puzzle threshold, wherein complexity is proportional to a number of character options in the password or puzzle;
receive a puzzle attempt;
determine whether the puzzle attempt is correct; and
grant access to the privileged function, responsive to a determination that the puzzle attempt is correct.

7. The computer program product of claim 6, wherein in determining that the trust is below the trust threshold, the program code readable/executable by the computer further determines that the trust is above a puzzle trust threshold, and further comprising program code readable/executable by the computer to:
responsive to a determination that the puzzle attempt is correct, increase the trust;
subsequent to granting access to the privileged function, accumulate a second period of inactivity to form a second trust;
receive a second request to access a privileged function, and in response, determine whether the second trust is below the trust threshold and the puzzle trust threshold, wherein the puzzle trust threshold is lower than the trust threshold, and in response to the second trust being below the puzzle trust threshold, challenge the user to present the correct password for privileged function; and
in response to receiving the correct password for the privileged function, granting access to the privileged command.

8. The computer program product of claim 6, wherein complexity is inversely proportional to a memorability of the password or puzzle.

9. The computer program product of claim 6, wherein the program code is further readable/executable by the computer to:
adjust, by the computer, the trust is based on the at least one period of inactivity further comprises:
sum, by the computer, all periods of inactivity since a receiving a last password that is correct or a puzzle attempt that is correct, to form a sum;
divide, by the computer, a constant by the sum; and
the trust threshold is 60 seconds or less.

10. The computer program product of claim 9, wherein a period of inactivity, of the periods of inactivity, is any period where neither a mouse transmits input nor a keyboard transmits input for at least 0.5 seconds.

11. The computer program product of claim 6, wherein the program code readable/executable by the computer to grant, by the computer, access to the administrative function further operates in response to the determination that the puzzle attempt is correct.

12. A system comprising:
a bus;
a computer readable tangible storage device connected to the bus, wherein computer usable code is located in the computer readable tangible storage device;
a communication unit connected to the bus; and
a processing unit connected to the bus, wherein the processing unit executes the computer usable code for retaining trust, wherein the processing unit executes the computer usable program code to receive a correct password for a privileged function; set a trust to a maximum level; detect at least one period of inactivity; adjust a trust based on the at least one period of inactivity; receive a request to access an administrative function;

determine that the trust is below a trust threshold, responsive to receiving the request; challenge a user to present a puzzle of less complexity than a complexity of the correct password, responsive to determining that the trust is below the trust threshold; receive a puzzle attempt; determine whether the puzzle attempt is correct; and grant access to the privileged function, responsive to a determination that the puzzle attempt is correct.

13. The system of claim 12, wherein in determining that the trust is below the trust threshold, the processing unit executes the computer usable program code to determine that the trust is above a puzzle trust threshold, and wherein the processing unit further executes the computer usable program code to:
responsive to a determination that the puzzle attempt is correct, increase the trust;
subsequent to granting access to the privileged function, accumulate a second period of inactivity to form a second trust;
receive a second request to access a privileged function, and in response, determine whether the second trust is below the trust threshold and the puzzle trust threshold, wherein the puzzle trust threshold is lower than the trust threshold, and in response to the second trust being below the puzzle trust threshold, challenge the user to present the correct password for privileged function; and
in response to receiving the correct password for the privileged function, granting access to the privileged command.

14. The system of claim 12, wherein complexity is proportional to a number of character options in the password or puzzle.

15. The system of claim 14, wherein complexity is inversely proportional to a memorability of the password or puzzle.

16. The system of claim 12, wherein in executing the processing unit to adjust the trust is based on the at least one period of inactivity, the processing unit further executes computer usable program code to sum all periods of inactivity to form a sum; divide a constant by the sum; and the trust threshold is 60 seconds or less.

17. The system of claim 16, wherein a period of inactivity, of the periods of inactivity, is any period where neither a mouse transmits input nor a keyboard transmits input for at least 0.5 seconds.

* * * * *